(12) United States Patent
Knappe et al.

(10) Patent No.: US 6,850,496 B1
(45) Date of Patent: Feb. 1, 2005

(54) VIRTUAL CONFERENCE ROOM FOR VOICE CONFERENCING

(75) Inventors: Michael E. Knappe, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 759 days.

(21) Appl. No.: 09/591,891

(22) Filed: Jun. 9, 2000

(51) Int. Cl.[7] ............................ H04M 3/56; H04L 12/18
(52) U.S. Cl. .................. 370/260; 370/266; 379/202.01; 709/204
(58) Field of Search ................................. 370/260, 266; 379/202.01, 203.01, 204.01, 205.01, 206.01; 709/204, 205

(56) References Cited

U.S. PATENT DOCUMENTS

| | | | |
|---|---|---|---|
| 4,506,358 A | 3/1985 | Montgomery | 370/60 |
| 4,734,934 A | 3/1988 | Boggs et al. | 379/202 |
| 5,027,689 A | 7/1991 | Fujimori | 84/622 |
| 5,212,733 A | 5/1993 | DeVitt et al. | 381/119 |
| 5,440,639 A | 8/1995 | Suzuki et al. | 381/17 |
| 5,521,981 A | 5/1996 | Gehring | 381/26 |
| 5,734,724 A | 3/1998 | Kinoshita et al. | 381/17 |
| 5,889,843 A | * 3/1999 | Singer et al. | 379/202.01 |
| 5,991,385 A | * 11/1999 | Dunn et al. | 379/202.01 |
| 6,011,851 A | * 1/2000 | Connor et al. | 381/17 |
| 6,125,115 A | * 9/2000 | Smits | 370/389 |
| 6,327,567 B1 | * 12/2001 | Willehadson et al. | 704/270 |
| 6,408,327 B1 | * 6/2002 | McClennon et al. | 709/204 |
| 6,559,863 B1 | * 5/2003 | Megiddo | 345/753 |

\* cited by examiner

Primary Examiner—Min Jung
(74) Attorney, Agent, or Firm—Marger Johnson & McCollom, PC

(57) ABSTRACT

A system and method are disclosed for packet voice conferencing. The system and method divide a conferencing presentation sound field into sectors, and allocate one or more sectors to each conferencing endpoint. At some point between capture and playout, the voice data from each endpoint is mapped into its designated sector or sectors. Thereafter, when the voice data from a plurality of participants from multiple endpoints is combined, a listener can identify a unique apparent location within the presentation sound field for each participant. The system allows a conference participant to increase their comprehension when multiple participants speak simultaneously, as well as alleviate confusion as to who is speaking at any given time.

44 Claims, 10 Drawing Sheets

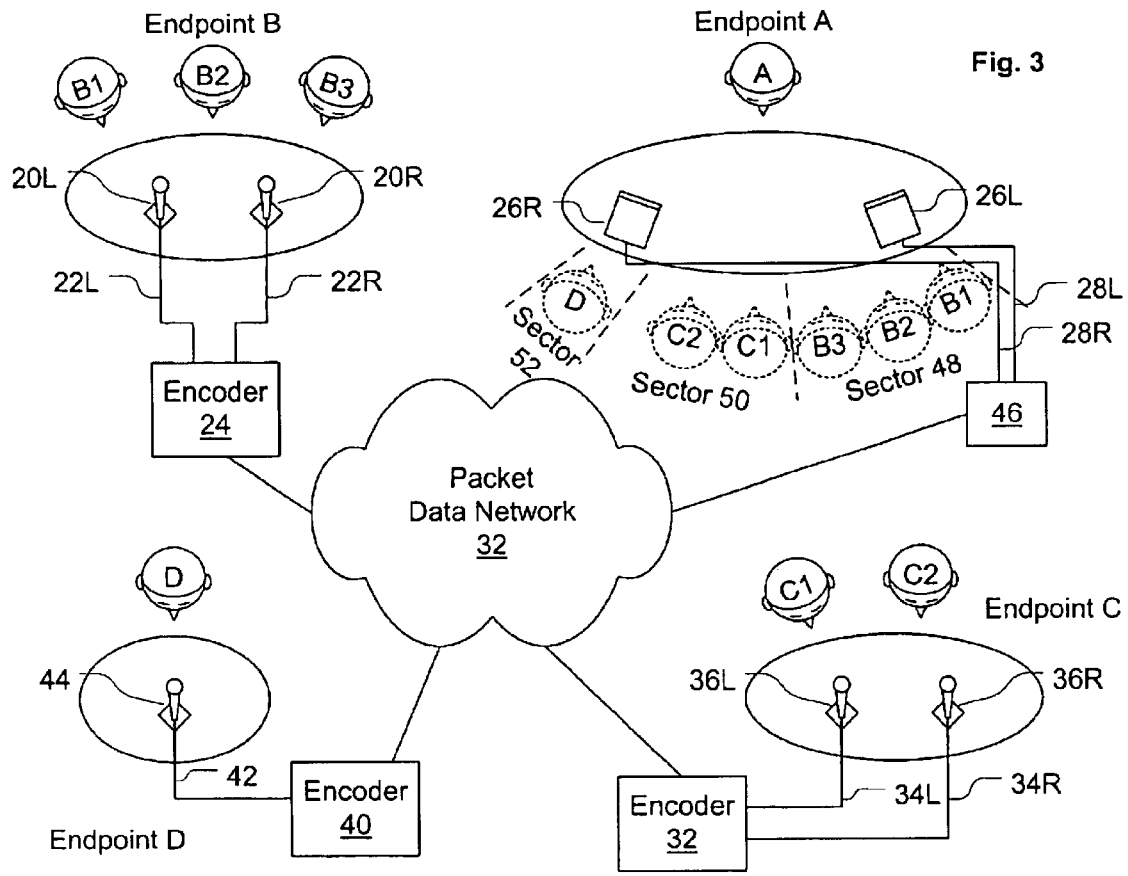
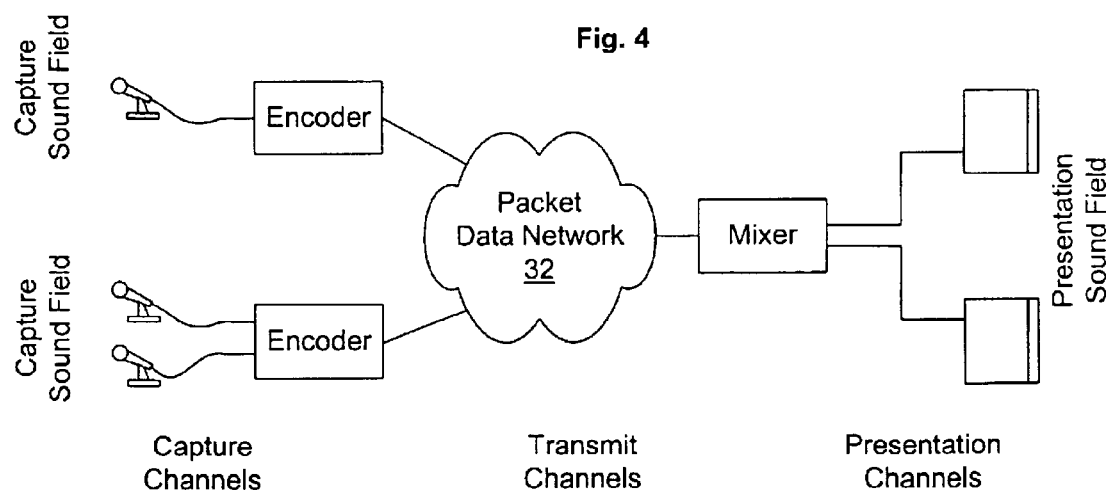

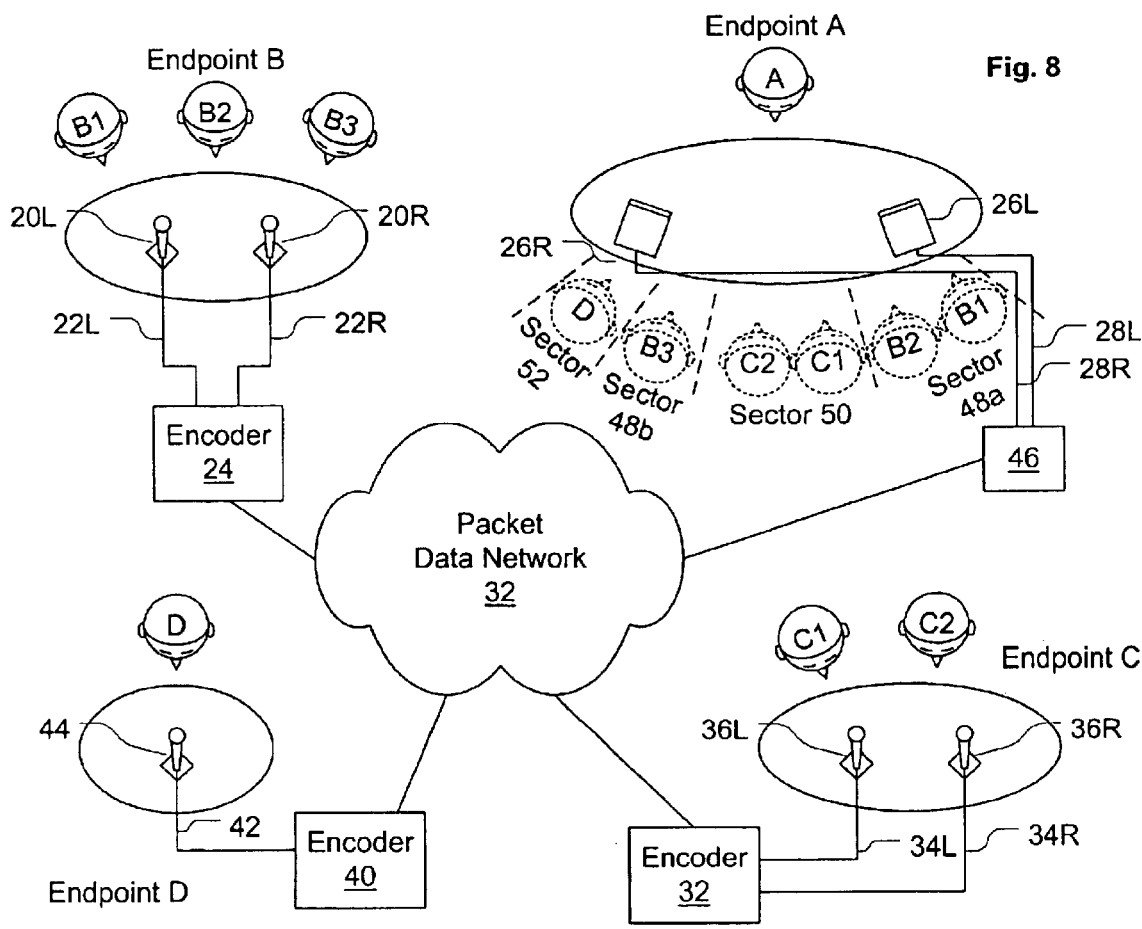
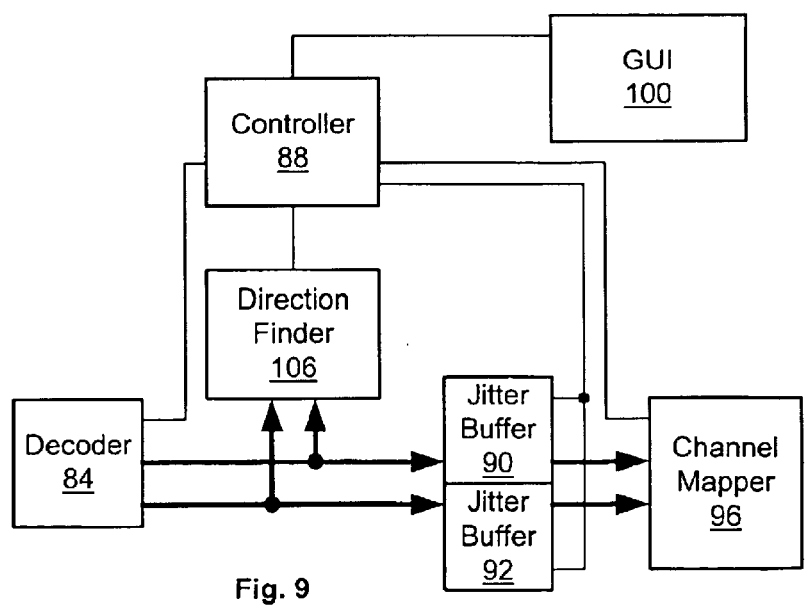
Fig. 9

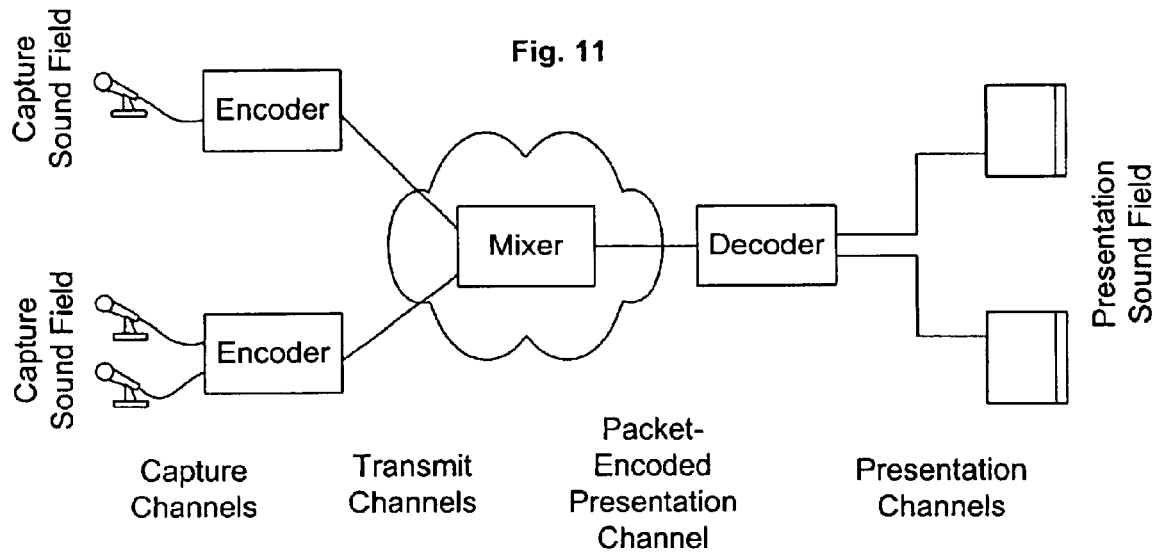
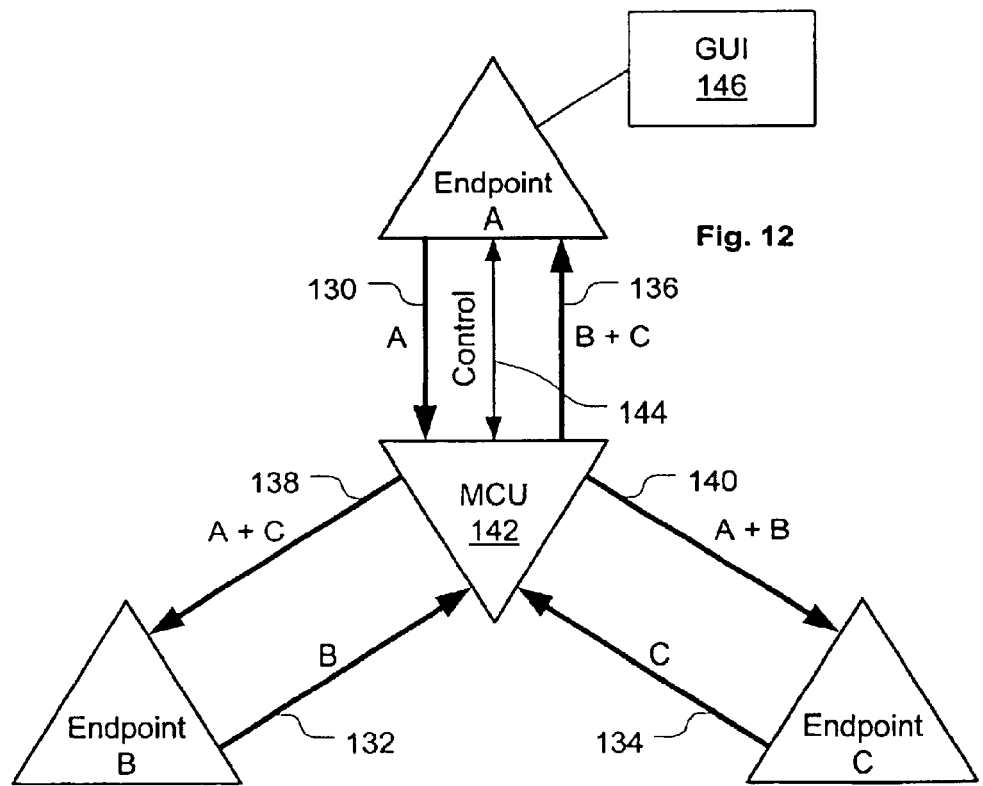

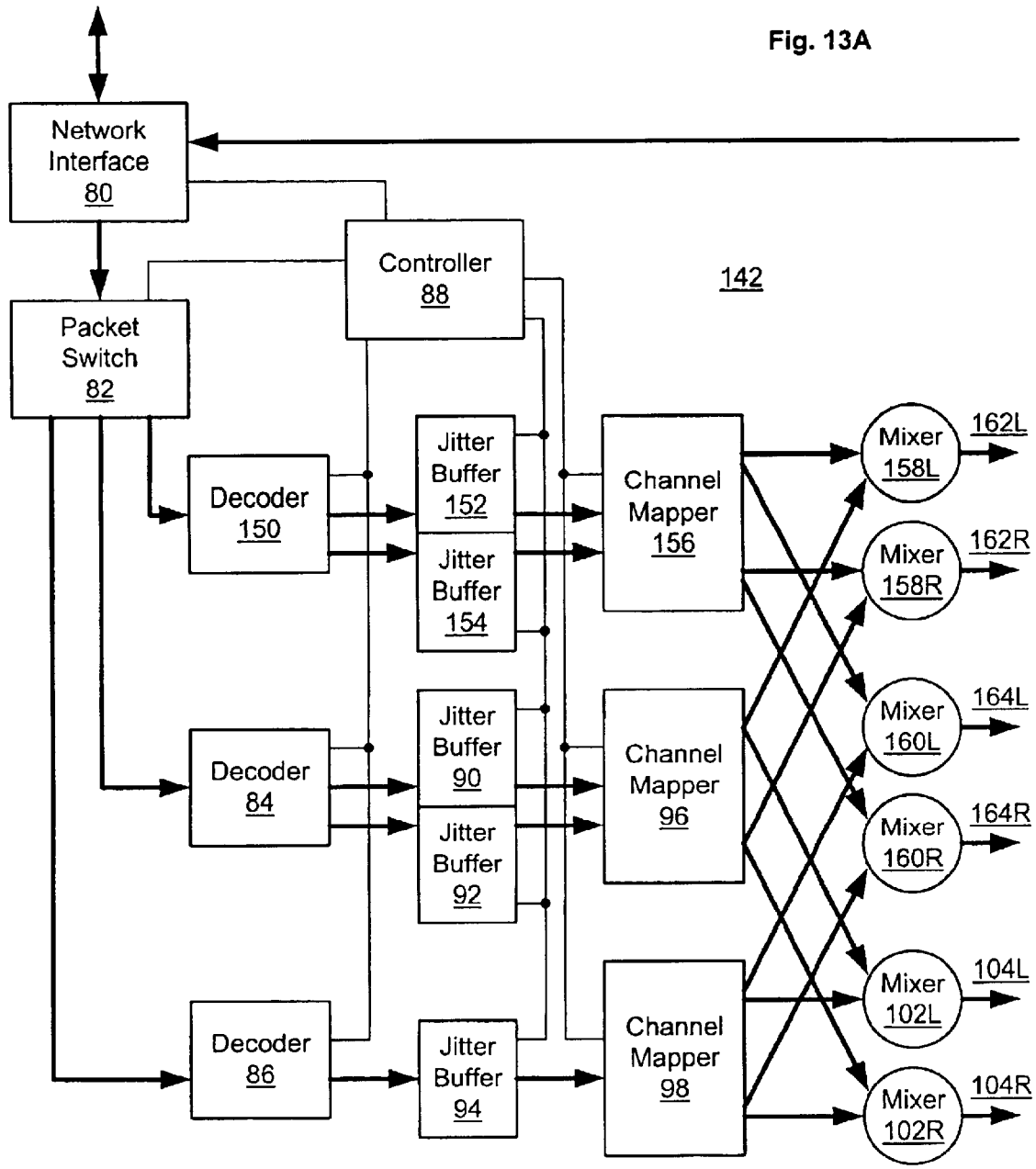
Fig. 13A
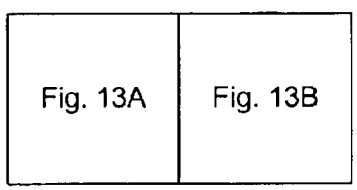

VIRTUAL CONFERENCE ROOM FOR VOICE CONFERENCING

FIELD OF THE INVENTION

This present invention relates generally to voice conferencing, and more particularly to systems and methods for use with packet voice conferencing to create a perception of spatial separation between conference callers.

BACKGROUND OF THE INVENTION

A conference call is a call between three or more callers/called parties, where each party can hear each of the other parties (the number of conferencing parties is often limited, and in some systems, the number of simultaneous talkers may also be limited). Conferencing capabilities exist in the PSTN (Public Switched Telephone Network), where remote caller's voices are mixed, e.g., at the central office, and then sent to a conference participant over their single line. Similar capabilities can be found as well in many PBX (Private Branch Exchange) systems.

Packet-switched networks can also carry real time voice data, and therefore, with proper configuration, conference calls. Voice over IP (VoIP) is the common term used to refer to voice calls that, over at least part of a connection between two endpoints, use a packet-switched network for transport of voice data. VoIP can be used as merely an intermediate transport media for a conventional phone, where the phone is connected through the PSTN or a PBX to a packet voice gateway. But other types of phones can communicate directly with a packet network. IP (Internet Protocol) phones are phones that may look and act like conventional phones, but connect directly to a packet network. Soft phones are similar to IP phones in function, but are software-implemented phones, e.g., on a desktop computer.

Since VoIP does not use a dedicated circuit for each caller, and therefore does not require mixing at a common circuit switch point, conferencing implementations are somewhat different than with circuit-switched conferencing. In one implementation, each participant broadcasts their voice packet stream to each other participant—at the receiving end, the VoIP client must be able to add the separate broadcast streams together to create a single audio output. In another implementation, each participant addresses their voice packets to a central MCU (Multipoint Conferencing Unit). The MCU combines the streams and sends a single combined stream to each conference participant.

SUMMARY OF THE INVENTION

Human hearing relies on a number of cues to increase voice comprehension. In any purely audio conference, several important cues are lost, including lip movement and facial and hand gestures. But where several conference participant's voice streams are lumped into a common output channel, further degradation in intelligibility may result because the sound localization capability of the human binaural hearing system is underutilized. In contrast, when two people's voices can be perceived as arriving from distinctly different directions, binaural hearing allows a listener to more easily recognize who is talking, and in many instances, focus on what one person is saying even though two or more people are talking simultaneously.

The present invention takes advantage of the signal processing capability present at either a central MCU or at a conferencing endpoint to add directional cues to the voices present in a conference call. In several of the disclosed embodiments, a conferencing endpoint is equipped with a stereo (or other multichannel) audio presentation capability. The packet data streams arriving from other participant's locations are decoded if necessary. Each stream is then mapped into different, preferably non-overlapping arrival directions or sound field sectors by manipulating, e.g., the separation, phase, delay, and/or audio level of the stream for each presentation channel. The mapped streams are then mixed to form the stereo (or multichannel) presentation channels.

A further aspect of the invention is the capability to control the perceived arrival direction of each participant's voice. This may be done automatically, i.e., a controller can partition the available presentation sound field to provide a sector of the sound field for each participant, including changing the partitioning as participants enter or leave the conference. In an alternate embodiment, a Graphical User Interface (GUI) is presented to the user, who can position participants according to their particular taste, assign names to each, etc. The GUI can even be combined with Voice Activity Detection (VAD) to provide a visual cue as to who is speaking at any given time.

In accordance with the preceding concepts and one aspect of the invention, methods for manipulating multiple packet voice streams to create a perception of spatial separation between conference participants are disclosed. Each packet voice stream may represent monaural audio data, stereo audio data, or a larger number of capture channels. Each packet voice stream is mapped onto the presentation channels in a manner that allocates a particular sound field sector to that stream, and then the mapped streams are combined for presentation to the conferencer as a combined sound field.

In one embodiment, the methods described above are implemented in software. In other words, one intended embodiment of the invention is an apparatus comprising a computer-readable medium containing computer instructions that, when executed, cause a processor or multiple communicating processors to perform a method for manipulating multiple packet voice streams to create a perception of spatial separation between conference participants.

In a second aspect of the invention, a conferencing sound localization system is disclosed. The system includes means for manipulating a capture or transmit sound field into a sector of a presentation sound field, and means for specifying different presentation sound field sectors for different capture or transmit sound fields. The sound localization system can be located at a conferencing endpoint, or embodied in a central MCU.

BRIEF DESCRIPTION OF THE DRAWING

The invention may be best understood by reading the disclosure with reference to the drawing, wherein:

FIG. 3 illustrates a packet-switched stereo telephony system in use for a conference call according to an embodiment of the invention;

FIG. 4 correlates different parts of a packet-switched stereo telephony transmission path with channel terminology;

FIG. 8 illustrates a packet-switched stereo telephony system in use for a conference call according to an embodiment of the invention;

FIG. 9 contains a high-level block diagram for endpoint signal processing for an endpoint utilizing a direction finder to map speakers from a common endpoint to different locations in a presentation sound field;

FIG. 11 correlates different parts of a central-MCU packet-switched stereo telephony transmission path with channel terminology;

FIG. 12 shows packet data virtual channels that exist in a three-way conference with mixing provided at a central MCU according to an embodiment of the invention;

FIGS. 13A and 13B contain a high-level block diagram for central MCU signal processing according to an embodiment of the invention;

DETAILED DESCRIPTION

Figure 1:
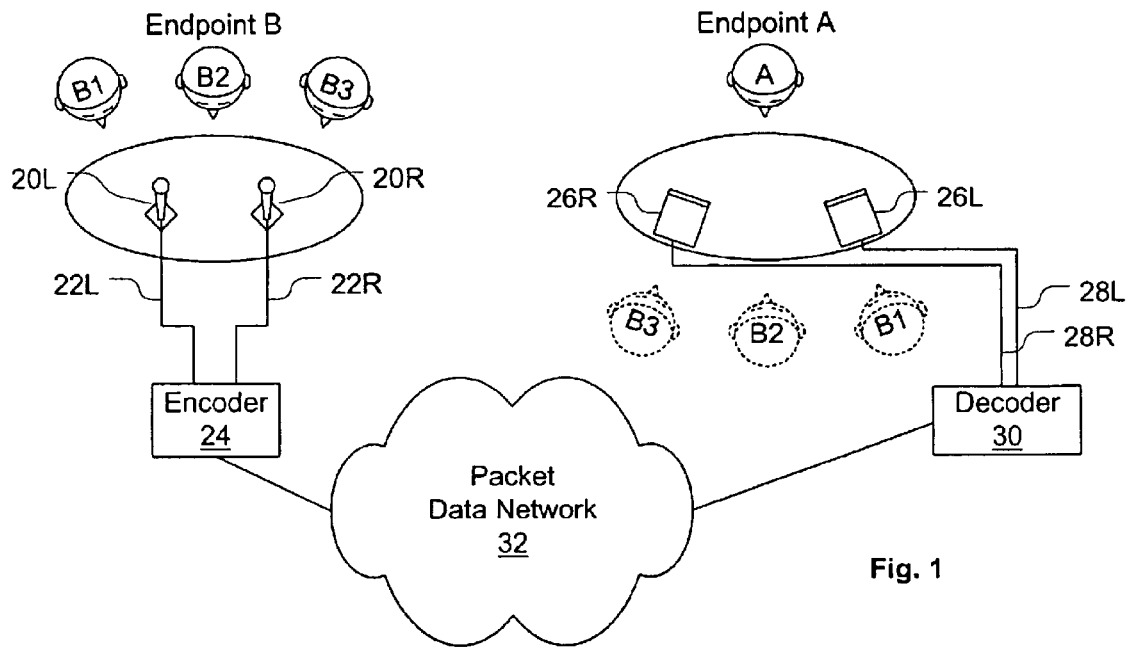
FIG. 1 illustrates a packet-switched stereo telephony system.

As an introduction to the embodiments, a brief introduction to some underlying technology and related terminology is useful. Referring to FIG. 1, one-half of a two-way stereo conference between two endpoints (the half allowing A to hear B1, B2, and B3) is depicted. A similar reverse path (not shown) allows A's voice to be heard by B1, B2, and B3.

The elements shown in FIG. 1 include: two microphones 20L, 20R connected to an encoder 24 via capture channels 22L, 22R; two speakers 26L, 26R connected to a decoder 30 via presentation channels 28L, 28R, and a packet data network 32 over which encoder 24 and decoder 30 communicate.

Microphones 20L and 20R simultaneously capture the sound field produced at two spatially separated locations when B1, B2, or B3 talk, translate the captured sound field to electrical signals, and transmit those signals over left and right capture channels 22L and 22R. Capture channels 22L and 22R carry the signals to encoder 24.

Encoder 24 and decoder 30 work as a pair. Usually at call setup, the endpoints establish how they will communicate with each other using control packets. As part of this setup, encoder 24 and decoder 30 negotiate a codec (compressor/decompressor) algorithm that will be used to transmit capture channel data from encoder 24 to decoder 30. The codec may use a technique as simple as Pulse-Code Modulation (PCM), or a very complex technique, e.g., one that uses subband coding and/or predictive coding to decrease bandwidth requirements. Voice Activity Detection (VAD) may be used to further reduce bandwidth. Many codecs have been standardized and are well known to those skilled in the art, and the particular codec selected is not critical to the operation of the invention. For stereo or other multichannel data, various techniques may be used to exploit channel correlation as well.

Encoder 24 gathers capture channel samples for a selected time block (e.g., 10 ms), compresses the samples using the negotiated codec, and places them in a packet along with header information. The header information typically includes fields identifying source and destination, time-stamps, and may include other fields. A protocol such as RTP (Real-time Transport Protocol) is appropriate for transport of the packet. The packet is encapsulated with lower layer headers, such as an IP (Internet Protocol) header and a link-layer header appropriate for the encoder's link to packet data network 32. The packet is then submitted to the packet data network. This encoding process is then repeated for the next time block, and so on.

Packet data network 32 uses the destination addressing in each packet's headers to route that packet to decoder 30. Depending on a variety of network factors, some packets may be dropped before reaching decoder 30, and each packet can experience a somewhat random network transit delay, which in some cases can cause packets to arrive at their destination in a different order than that in which they were sent.

Decoder 30 receives the packets, strips the packet headers, and re-orders the packets according to timestanp. If a packet arrives too late for its designated playout time, however, the packet will simply be dropped by the decoder. Otherwise, the re-ordered packets are decompressed and amplified to create two presentation channels 28L and 28R. Channels 28L and 28R drive acoustic speakers 26L and 26R.

Ideally, the whole process described above occurs in a relatively short period of time, e.g., 250 ms or less from the time B1 speaks until the time A hears B1's voice. Longer delays cause noticeable voice quality degradation, but can be tolerated to a point.

A's binaural hearing capability allows A to localize each speaker's voice in a distinct location within their listening environment. If the delay and amplitude differences between the sound field at microphone 20L and at microphone 20R can be faithfully transmitted and then reproduced by speakers 26L and 26R, B1's voice will appear to A to originate at roughly the dashed location shown for B1. Likewise, B2's voice and B3's voice will appear to A to originate, respectively, at the dashed locations shown for B2 and B3.

Figure 2:
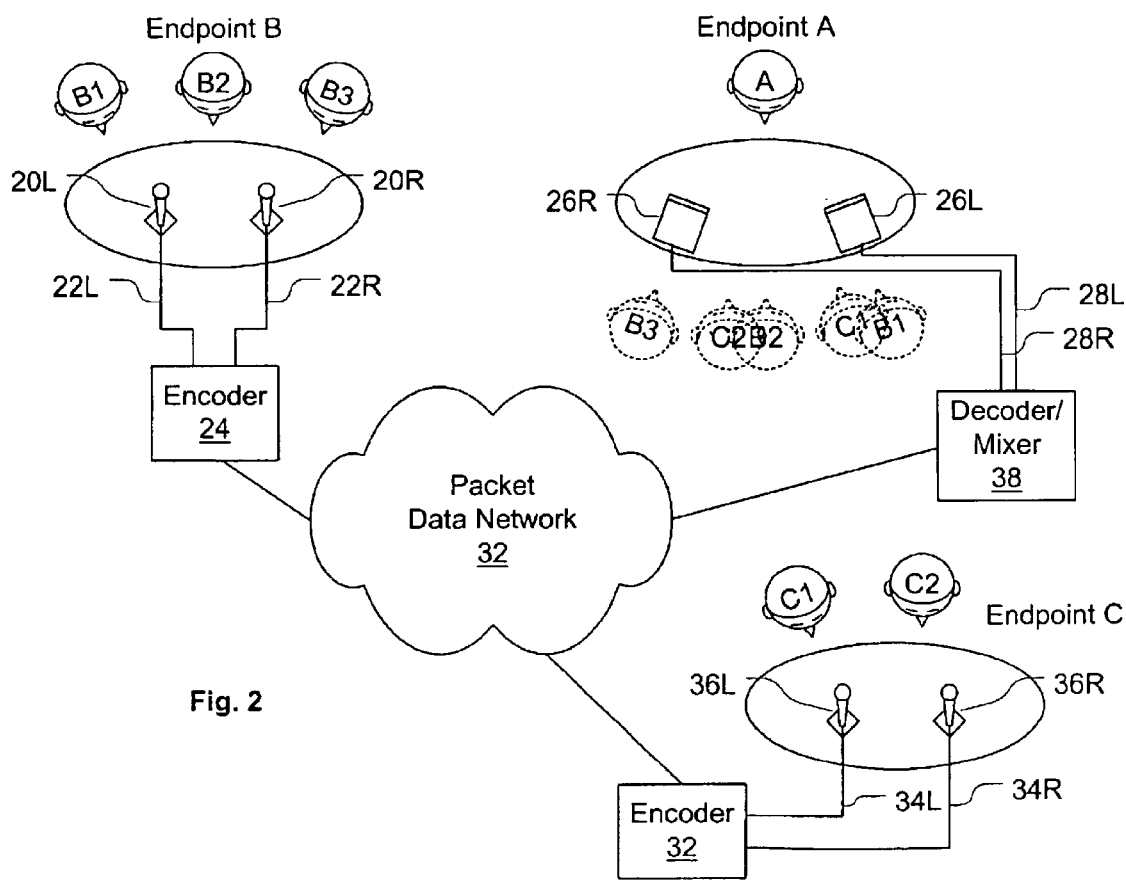
FIG. 2 illustrates a packet-switched stereo telephony system in use for a conference call.

Now consider the three-way conference of FIG. 2. A third endpoint, endpoint C, with two additional conference participants C1 and C2 has been added. Endpoint C uses an encoder 32, capture channels 34L and 34R, and microphones 36L and 36R in much the same way as described for the corresponding components of endpoint B.

Decoder/mixer 38 differs from decoder 30 of FIG. 1 in several significant respects. First, decoder/mixer 38 must be capable of receiving, processing, and decoding two packet voice data streams simultaneously. Second, decoder/mixer 38 must add the left decoded signals from endpoints B and C together in order to create presentation channel 28L, and must do likewise with the right decoded signals to create presentation channel 28R.

FIG. 2 illustrates the perception problem that A now faces in the three-way conference. The perceived locations of B1 and C1 overlap, as do the perceived locations of B2 and C2. A can no longer identify from directional cues alone who is speaking, and cannot use binaural hearing to sort out two simultaneous speaker's voices that appear to be originating at the same general location. Of course, with a monaural three-way conference, a similar problem exists, as all speakers from all endpoints would appear to be speaking from the same central location.

FIG. 3 illustrates the operation of one embodiment of the invention for the conferencing configuration of FIG. 2. To illustrate a further aspect of the invention, a fourth endpoint D, with a corresponding encoder 40, capture channel 42, and microphone 44 has been added. Endpoint D has only monaural capture capability, as opposed to the stereo capture capability of endpoints B and C. Decoder/mixer 38 of FIG. 2 has been replaced with a packet voice conferencing system 46 according to an embodiment of the invention. All other conferencing components of FIG. 2 have been carried over into FIG. 3.

Whereas, in the preceding illustrations, the decoder or decoder/mixer attempted to recreate at endpoint A the capture sound field(s), that is no longer the case in FIG. 3. The presentation sound field has been divided into three sectors 48, 50, 52. Voice data from endpoint B has been mapped to sector 48, voice data from endpoint C has been mapped to sector 50, and voice data from endpoint D has been mapped to sector 52 by system 46. Thus endpoint B's capture sound field has been recreated "compressed" and shifted over to A's left, endpoint C's capture sound field has been compressed and appears roughly right of center, and endpoint D's monaural channel has been converted to stereo and shifted to the far right of A's perceived sound field. Although the conference participants' voices are not recreated according to their respective capture sound fields, the result is a perceived separation between each speaker. As stated earlier, such a mapping can have beneficial effects in terms of A's recognition of who is speaking and in focusing on one voice if several persons speak simultaneously.

Turning briefly to FIG. 4, the meaning of several terms as they apply in this description is explained. A capture sound field is the sound field presented to a microphone. A presentation sound field is the sound field presented to a listener. A capture channel is a signal channel that delivers a representation of a capture sound field to an encoding device—this may be anything from a simple wire pair, to a wireless link, to a telephone and PBX or PSTN facilities used to deliver a telephone signal to a remote voice network gateway. A transmit channel is a packet-switched virtual channel, or possibly a Time-Division-Multiplexed (TDM) channel, between an encoder and a mixer—sections of such a channel may be fixed, e.g., a modem connection, but in general each packet will share a physical link with other packet traffic. And although separate transmit channels may be used for each capture channel originating at a given endpoint, in general a common transmit channel for all capture channels is preferred. A presentation channel is a signal channel that exists between a mixer and a device (e.g., an acoustic speaker) used to create a presentation sound field—this may include wiring, wireless links, amplifiers, filters, D/A or other format converters, etc. As will be explained later, part of the presentation channel may also exist on the packet data network when the mixer and acoustic speakers are not co-located.

In the following description, most examples make reference to a three-way conference between three endpoints. Each endpoint can have more than one speaking participant. Furthermore, those skilled in the art recognize that the concepts discussed can be readily extended to larger conferences with many more than three endpoints, and the scope of the invention extends to cover larger conferences. On the other end of the endpoint spectrum, some embodiments of the invention are useful with as few as two conferencing endpoints, with one endpoint having two or more speakers with different capture channel arrival angles.

Figure 5:
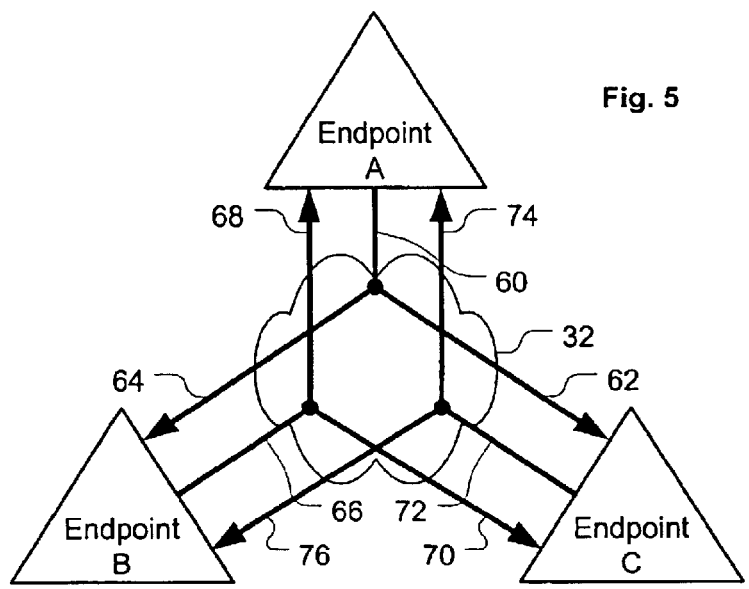
FIG. 5 shows packet data virtual channels that exist in a three-way conference with mixing provided at the endpoints.

FIG. 5 illustrates, for a three-endpoint conference, one channel configuration that can be used with the invention. Endpoint A multicasts a packet voice data stream over virtual channel 60. Somewhere within packet data network 32, a switch or router (not shown) splits the stream, sending the same packet data over virtual channel 62, to endpoint C, and over virtual channel 64, to endpoint B. If this multicast capability is unsupported, endpoint A can broadcast two unicast packet voice data streams, one to each other endpoint.

Endpoint A also receives two packet voice data streams, one over virtual channel 68 from endpoint B, and one over virtual channel 74 from endpoint C. In general, each endpoint receives N–1 packet voice data streams, and transmits either one voice data stream, if multicast is supported, or N–1 unicast data streams otherwise. Accordingly, this channel configuration is better suited to smaller conferences (e.g., three or four endpoints) than it is to larger conferences, particularly where bandwidth at one or more endpoints is an issue.

Figure 6:
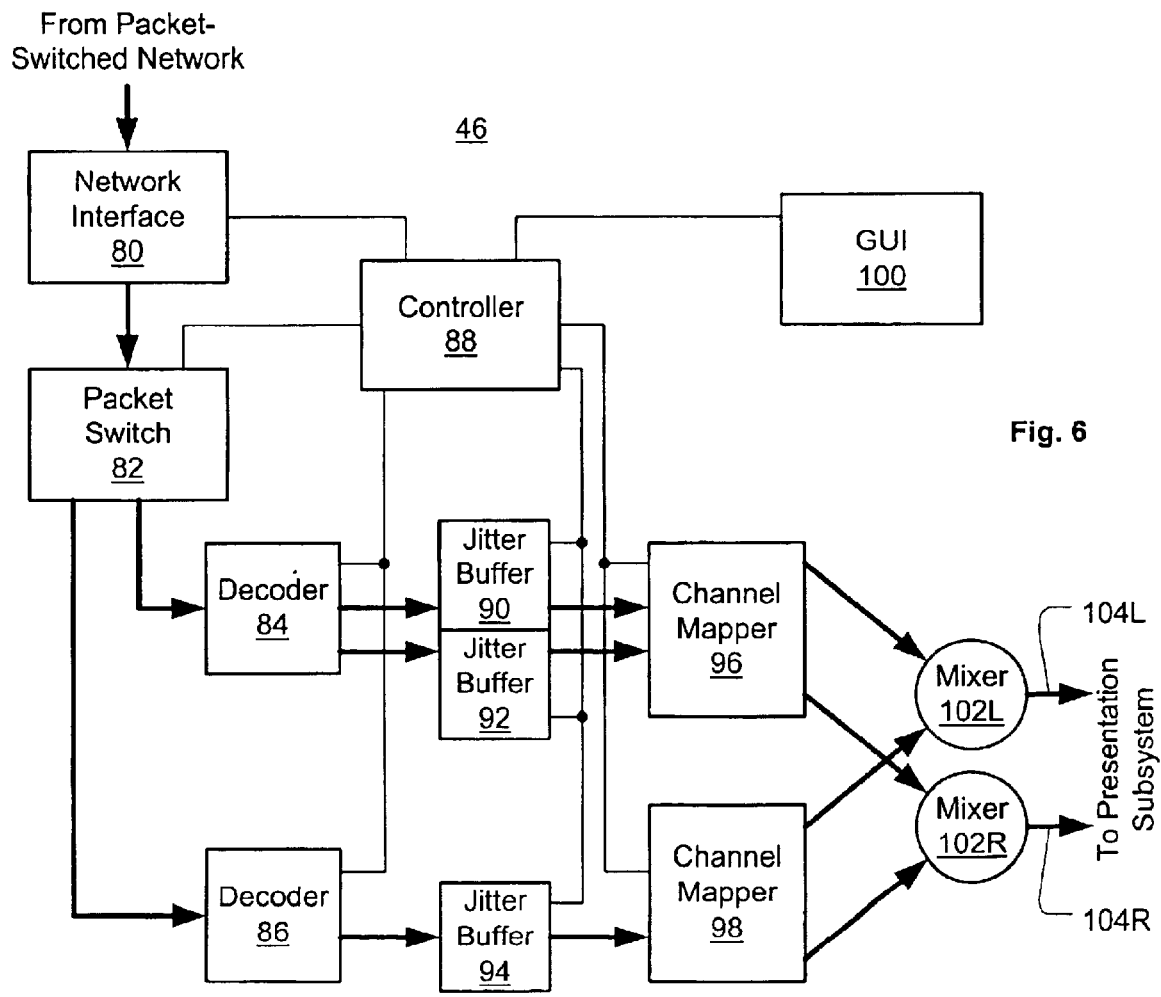
FIG. 6 contains a high-level block diagram for endpoint signal processing according to an embodiment of the invention.

FIG. 6 illustrates a high-level block diagram for one embodiment of a packet voice conferencing system 46. Network interface 80 provides connectivity between a packet-switched network and the remainder of system 46. Controller 88 sends and receives control packets to/from remote endpoints using network interface 80. Incoming voice data packets are forwarded by network interface 80 to packet switch 82. Although not illustrated in this embodiment, the system will typically also contain an encoder for outgoing conference voice traffic. The encoder will submit outgoing voice data packets to network interface 80 for transmission. Network interface 80 can comprise the entire protocol stack and physical layer hardware, an application driver that receives RTP and control packets, or something in between.

Packet switch 82 distributes voice data packets to the appropriate decoder. In FIG. 6, it is assumed that two remote endpoints are broadcasting voice data streams to system 46, and so two decoders 84 and 86 are employed, one per stream. Packet switch 82 distributes voice packets from one remote endpoint to decoder 84, and distributes voice packets from the other remote endpoint to decoder 86 (when more endpoints are joined in the conference, the number of decoders, jitter buffers, and channel mappers is increased accordingly). Packet switch 82 identifies packets belonging to a given voice data stream by examining header fields that uniquely identify the voice stream—for an RTP/UDP (User Datagram Protocol)/IP packet, these fields can be, e.g., one or more of the source IP address, source UDP port, and RTP SSRC (synchronization source) identifier. Controller 88 is responsible for providing packet switch 82 with the field values for a given voice stream, and with an association of those field values with a decoder.

Decoders 84 and 86 can use any suitable codec upon which the system and the respective encoding endpoint successfully agree. Each codec may be renegotiated during a conference, e.g., if more participants place a bandwidth or processing strain on conference resources. And the same codec need not be run by each decoder—indeed, in FIG. 6, decoder 84 is shown decoding a stereo voice data stream, while decoder 86 is shown decoding a monaural voice data stream. Controller 88 performs the actual codec negotiation with remote endpoints. In response to this negotiation, controller 88 activates, initializes, and reinitializes (when and if necessary) each decoder as needed for the conference. In most implementations, each decoder will be a process or thread running on a digital signal processor or general-purpose processor, but many codecs can also be implemented in hardware. The maximum number of streams that can be concurrently decoded in such an implementation will generally be limited by real-time processing power and available memory.

Jitter buffers 90, 92, and 94 receive the voice data streams output by decoders 84 and 86. The purpose of the jitter buffers is to provide for smooth audio playout, i.e., to account for the normal fluctuations in voice data sample arrival rate from the decoders (both due to network delays and to the fact that many samples arrive in each packet). Each jitter buffer ideally attempts to insert as little delay in the transmission path as possible, while ensuring that audio playout is rarely, if ever, starved for samples. Those skilled in the art recognize that various methods of jitter buffer management are well known, and the selection of a particular method is left as a design choice. In the embodiment shown in FIG. 6, controller 88 controls jitter buffer synchronization by manipulating the relative delays of the buffers.

Channel mappers 96 and 98 each manipulate their respective input voice data channels to form a set of presentation mixing channels. Controller 88 manages each channel mapper by providing mapping instructions, e.g., the number of input voice data channels, the number of output presentation mixing channels, and the presentation sound field sector that should be occupied by the presentation mixing channels. This last instruction can be replaced by more specific instructions, e.g., delay the left channel 2 ms, mix 50% of the left channel into the right channel, etc., to accomplish the mapping. In the former case, the channel mapper itself contains the ability to calculate a mapping to a desired sound field; in the latter case, these computations reside in the controller, and the channel mapper performs basic signal processing functions such as channel delaying, mixing, phase shifting, etc., as instructed.

A number of techniques are available for sound field mapping. From studies of human hearing capabilities, it is known that directional cues are obtained via several different mechanisms. The pinna, or outer projecting portion of the ear, reflects sound into the ear in a manner that provides some directional cues, and serves a primary mechanism for locating the inclination angle of a sound source. The primary left-right directional cue is ITD (interaural time delay) for mid-low- to mid-frequencies (generally several hundred Hz up to about 1.5 to 2 kHz). For higher frequencies, the primary left-right directional cue is ILD (interaural level differences). For extremely low frequencies, sound localization is generally poor.

ITD sound localization relies on the difference in time that it takes for an off-center sound to propagate to the far ear as opposed to the nearer ear—the brain uses the phase difference between left and right arrival times to infer the location of the sound source. For a sound source located along the symmetrical plane of the head, no inter-ear phase difference exists; phase difference increases as the sound source moves left or right of center, the difference reaching a maximum when the sound source reaches the extreme left or right of the head. Once the ITD that causes the sound to appear at the extreme left or right is reached, further delay may be perceived as an echo.

In contrast, ILD is based on inter-ear differences in the perceived sound level—e.g., the brain assumes that a sound that seems louder in the left ear originated on the left side of the head. For higher frequencies (where ITD sound localization becomes difficult), humans rely chiefly on ILD to infer source location.

Channel mappers 96 and 98 can position the apparent location of their assigned conferencing endpoints within the presentation sound field by manipulating ITD and/or ILD for their assigned voice data channels. If a conferencing endpoint is broadcasting monaurally and the presentation system uses stereo, a preliminary step can be to split the single channel by forming identical left and right channels. Or, the single channel can be directly mapped to two channels with appropriate ITD/ILD effects introduced in each channel. Likewise, an ITD/ILD mapping matrix can be used to translate a monophonic or stereophonic voice data channel to, e.g., a traditional two-speaker, 3-speaker (left, right, center) or 5.1 (left-rear, left, center, right, right-rear, subwoofer) format.

Depending on the processing power available for use by the channel mappers—as well as the desired fidelity—various effects ranging from computationally simple to computationally intensive can be used. For instance, one simple ITD approach is to delay one voice data channel from a given endpoint with respect to a companion voice data channel. For stereo, this can be accomplished by "reading ahead" from the jitter buffer for one channel. For instance, at an 8 kHz sample frequency, a 500 microsecond relative delay in the right channel can be simulated by reading and playing out samples from jitter buffer 90 four samples ahead of samples from jitter buffer 92. This delays the right channel playout with respect to the left, shifting the apparent location of that conference endpoint more to the left within the presentation sound field.

A more complex method is to change the relative phase of one voice data channel from a given endpoint with respect to another of the voice data channels. Although phase is related to delay, it is also related to frequency—an identical time delay causes greater phase shift for increasing frequency. Digital phase-shifters can be employed to obtain a desired phase-shift curve for one or more voice data channels. If, for instance, a relatively constant phase shift across a frequency band is desired, a digital filter with unity gain and appropriate phase shift can be employed. Those skilled in the art will recognize that digital phase shifter implementations are well-documented and can be readily adapted to this new application. As such, further details of phase shifter operation have been omitted from this disclosure.

For frequency components over about 1.5 to 2 kHz, delay and phase-shifting may be an ineffective means of shifting the apparent location of an endpoint within the presentation field. In many voice conferences, however, spectral content at these higher frequencies will be relatively small. Therefore, one design choice is to just delay all frequency components the same, and live with any ineffectiveness exhibited at higher frequencies. One can also choose to manipulate ILD for all frequencies, or just for subchannels containing higher frequencies. A low-complexity method for manipulating ILD is to change the relative amplitude of one voice data channel from a given endpoint with respect to another of the voice data channels from that endpoint. Alternately, one can split a portion of one voice data channel from its channel and add that portion to another of the voice data channels—although suboptimal, this method affects both ILD and ITD. Of course, combinations of methods, such as splitting one channel, delaying one part of the split, and adding the other part to another channel can also be used.

Controller 88 relays presentation sound field sector assignments to each mapper. In one embodiment, controller 88 automatically and fairly allocates the presentation sound field amongst all incoming conferencing endpoints. Of course, "fair" can mean that a monophonic sound source is allocated a smaller sector of the sound field than a stereo sound source is allocated. "Fair" can also note how active each endpoint is in the conversation, and shrink or expand sectors accordingly. Finally, the allocation can be changed dynamically as endpoints are dropped or added to the conference.

Generally, mapper 96 and mapper 98 will receive different transform parameters from controller 88, with the goal of localizing each conferencing endpoint in a sector of the presentation sound field that is substantially non-overlapping with the sectors assigned to the other conferencing endpoints. For instance, assume a ninety-degree wide presentation sound field using a left and a right speaker. Mapper 96 can be assigned the leftmost 60 degrees of the sound field (because it has a stereo source) and mapper 98 can be assigned the rightmost 30 degrees of the sound field. Mapper 98 can map its mono source as far to the right as possible, e.g., by playing out only on the right channel, or by playing out on both channels with a maximum ITD on the left channel. Meanwhile, mapper 96 shrinks its stereo field slightly and biases it to the left, e.g., by playing out part of the left input channel, heavily delayed, on the right, and by playing out part of the right input channel, with a short delay, on the left.

Mixers 102L and 102R produce presentation channels 104L and 104R from the outputs of mappers 96 and 98. Mixer 102L adds the left outputs of mappers 96 and 98. Mixer 102R adds the right outputs of mappers 96 and 98. Although not shown, D/A converters can be placed at the outputs of mixers 102L and 102R to create an analog presentation channel pair.

FIG. 6 also shows an optional GUI 100. The broad purpose of GUI 100 is to allow the user to interact with the conferencing system. This interaction encompasses two narrower purposes. The first is to allow the listener to manually specify and adjust the presentation sound field sector to be used for each conferencing endpoint or participant. The second is to provide a visual representation of who is where within the sound field, and perhaps even who is talking. Each of these purposes will be addressed in turn.

Figure 7A:
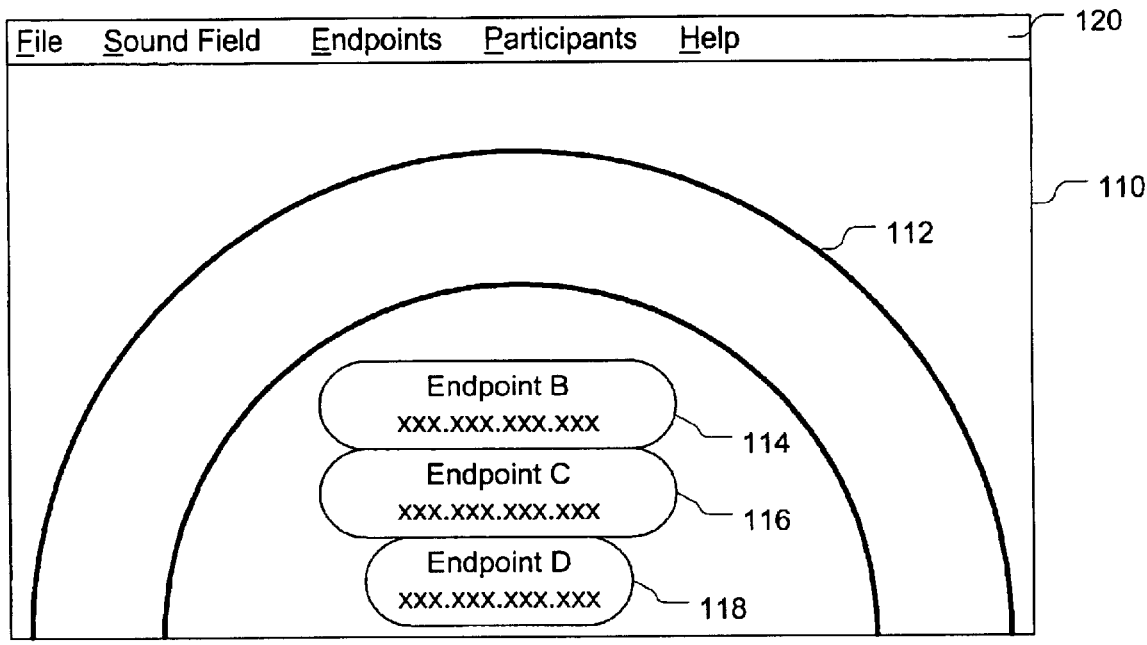
FIGS. 7A and 7B illustrate a GUI display useful with the invention.
Figure 7B:
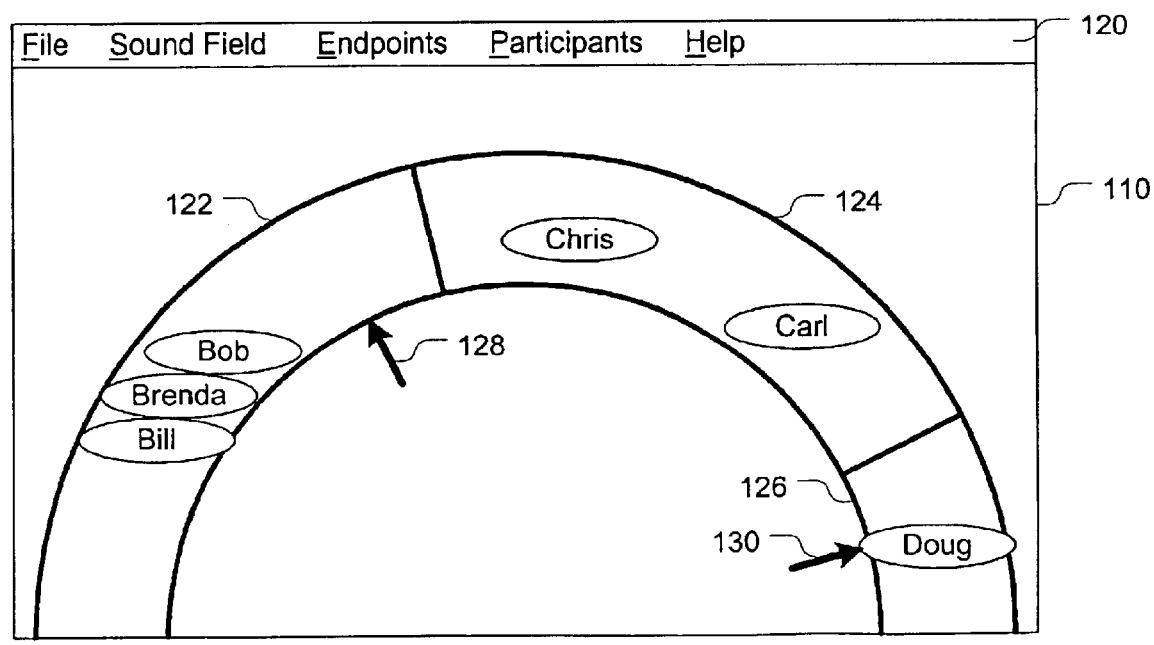

GUI 100 can allow a user to manually partition the sound field. One possible GUI "look and feel", illustrated in FIGS. 7A and 7B, shows a method of manual partitioning. FIG. 7A shows a GUI screen 110 at the start of a conference call. The presentation sound field is represented in GUI screen 110 by annular half-circle 112. Endpoints B, C, and D are portrayed respectively in blocks 114, 116, and 118 (endpoint D's block 118 is shown smaller than the others because D represents a monophonic sound source). The blocks initially appear to the inside of the half-circle 112, signaling that no sound field mapping is currently being done on any of these sources.

FIG. 7B shows GUI screen 110 after manipulation by a listener. The listener has created a presentation sound field sector for each endpoint, e.g., by dragging and dropping blocks 114, 116, and 118 onto half-circle 112. Endpoint B now occupies sector 122, i.e., approximately the leftmost 75 degrees of the sound field. Endpoint C now occupies, sector 124, i.e., the 75 degree sector from about 15 degrees left of center to about 60 degrees right of center. Endpoint D now occupies sector 126, i.e., approximately the rightmost 30 degrees of the sound field. Note that the listener has replaced the generic labels of each endpoint with icons containing the names of the conference participants at each location. The listener can also manipulate the widths of sectors 122, 124, and 126 by moving the sector dividers.

An additional, optional feature is illustrated by arrows 128 and 130. These arrows show, for endpoints with current voice activity, an estimate of the location of the voice activity in the sound field. Thus arrow 128 indicates that someone at the far right of endpoint B's sound field sector is speaking—if the listener can distinguish which participant is speaking, e.g., "Brenda", then Brenda's icon can be dragged towards the arrow. Arrow 130 indicates that someone at endpoint D is speaking, but because endpoint D is monophonic, no further localization can be performed. Accordingly, arrow 130 shows up at the middle of sector 126.

FIGS. 7A and 7B also show a menu bar 120 for accessing GUI capabilities, such as retrieving or saving a given conference configuration, setting the listener's sound field and speaker locations, adding participants, etc. Menu bar 120 illustrates that a variety of known GUI techniques may be employed with the invention. The precise GUI techniques chosen for use with an embodiment are not critical to the invention—those skilled in the art will immediately recognize that a plethora of visualization techniques, other than the one mentioned, are equally applicable.

GUI display 110 is generated by GUI driver 100 (FIG. 6). GUI driver 100 and controller 88 communicate with each other. Controller 88 tells GUI driver 100 which endpoints are active at any given time. If so equipped, controller 88 also tells GUI driver 100 the estimated sound field location for current voice activity. In return, GUI driver 100 supplies controller 88 with a user-defined presentation field sector for each endpoint.

For a stereo endpoint, a correlation algorithm is used to determine the location of, e.g., arrow 128 in FIG. 7B. The correlation algorithm runs when voice activity is present from the stereo endpoint. Preferably, the correlation algorithm compares the left channel to the right channel for various relative time shifts, and estimates the delay between the two channels as the time shift resulting in the highest correlation. The delay can be fed into an ITD model that returns an estimated speaker location, which is mapped onto the endpoint's presentation field sector and displayed as an arrow, or other visual signal, when the speaker is talking.

The correlation algorithm used to estimate delay can also be used to adapt sound field mapping for a single endpoint depending on who at that endpoint is speaking. For instance, in FIG. 8, endpoint B has been mapped to two spatially-separated sound field sectors 48a and 48b. According to this mapping, participant B3 appears to be speaking to A's right, from sector 48b, and participants B1 and B2 appear to speak from sector 48a to A's far left. The participants from endpoint C appear to be sitting between B3 and the other two B endpoint participants.

FIG. 9 contains a block diagram for one embodiment of an apparatus for achieving the effects shown in FIGS. 7B, 8, 10A, and 10B for one remote endpoint. Decoder 84 functions as in the previous embodiment, producing decoded stereo voice data to jitter buffers 90 and 92. The stereo voice data is also supplied to direction finder 106, which uses, e.g., a correlation algorithm as described above to determine an approximate arrival angle when voice activity is present in the stereo voice data. This angle may vary slightly for a given participant, but will hopefully vary by a much larger amount for different participants. Thus when a different participant speaks, a large shift in arrival angle should be observed. Such shifts will normally occur between voice data packets, but can conceivably occur within a single packet of voice data.

Direction finder 106 supplies the approximate arrival angle to controller 88, e.g., each time the angle changes by more than a threshold. When the user desires a split sound field for an endpoint, GUI 100 communicates the following to controller 88: one or more arrival angle splits to be made in the voice data; and, for each split, the desired presentation sound field sector mapping.

Controller 88 compares the arrival angle received from direction finder 106 to the arrival angle split(s) from GUI 100. The comparison determines which of the several presentation sound field sector mappings for the endpoint should be used for the current voice data. When a sector change is indicated, controller 88 calculates when the relevant voice data will exit jitter buffers 90 and 92, and instructs channel mapper 96 to remap the voice data to the new sector at the appropriate time. Note that in an alternate embodiment, the direction finder is employed at the point of sound field capture, and arrival angle information is conveyed in packets to controller 88 or decoder 84.

Figure 10A:
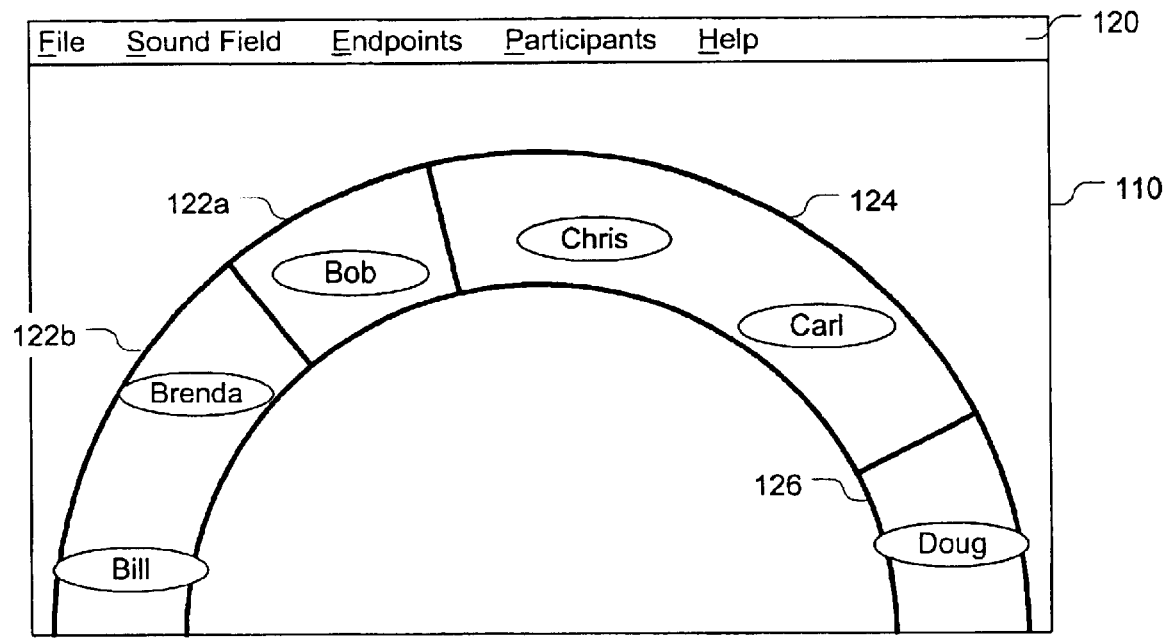
FIGS. 10A and 10B illustrate further aspects of a GUI display useful with the invention.
Figure 10B:
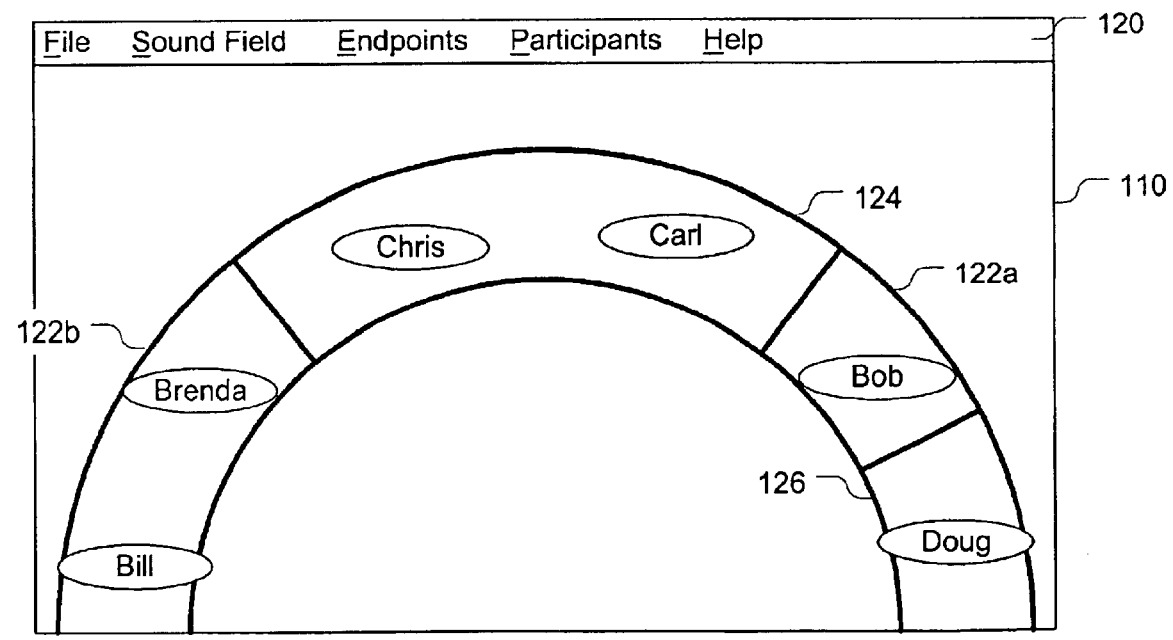

GUI manipulations for splitting an endpoint into two sectors are shown in FIGS. 10A and 10B. In FIG. 10A, sector 122 of FIG. 7B has been split into two sectors 122a and 122b, with the user selecting the desired partitioning. Optionally, the user can place some user icons in one sector and some in another, as shown. Thus the user may first determine where a particular speaker's voice is coming from, place that speaker's icon at that location, and then create a sector surrounding that icon. In FIG. 10B, sector 122a, containing the voice of "Bob", has been shifted between sectors 124 and 126. The system uses the split sectors to determine which one of two mappings to be used for Bob's endpoint at any given time, depending on whether the voice data appears to come from Bob's general direction or from another general direction.

Note that the configuration shown in FIG. 9 can be readily inserted into FIG. 6. But the configuration shown in FIG. 9 is also useful without multiple endpoint mixing. For example, in a two-way conference, with three participants at the remote endpoint, the user can use this configuration to manipulate where each remote participant's voice appears to eminate from.

Turning now to another embodiment, FIG. 11 illustrates a new channel type that applies to this embodiment, the packet-encoded presentation channel. Essentially, FIG. 11 shows the mixer split from the endpoint decoder, and connected by the packet-encoded presentation channel. The encoders transmit to the mixer instead of transmitting to the decoder directly.

FIG. 12 shows the channels used for a three-way conference according to this embodiment. Endpoints A, B, and C direct their respective packet voice streams 130, 132, 134 to MCU 142. MCU 142 performs mapping and mixing according to the invention, and transmits mixed packet voice streams 136, 138, and 140 respectively to endpoints A, B, and C. Additionally, one endpoint (A is shown) connects to a GUI 146, which designates the perceived voice direction of arrival for each conference participant. A conference control channel 144 connects endpoint A to MCU 142. Control channel 144 conveys the desired perceived direction of arrival for each conferencing participant to MCU 142, and may convey information back to GUI 146.

The embodiment shown in FIG. 12 has several advantages and several disadvantages when compared to the first embodiment. One advantage is that fewer packet voice data streams are needed—this is particularly a benefit when one or more endpoints have limited bandwidth. Also, each voice data stream can be unicast. And the MCU can be equipped with the invention, with no requirement that each endpoint have any particular capability other than receiving stereo (in the first embodiment, each endpoint can use the invention separate from all others). These advantages should be weighed against several disadvantages—the MCU must have the processing throughput to perform mapping and mixing, the MCU may significantly increase end-to-end delay, and the MCU may produce a tandem encoding. Tandem encoding refers to a signal that is encoded, decoded at some intermediate point, re-encoded, and then decoded again at the destination. Some codecs perform poorly if more than one encoding of the same voice stream is attempted.

Figure 13B:
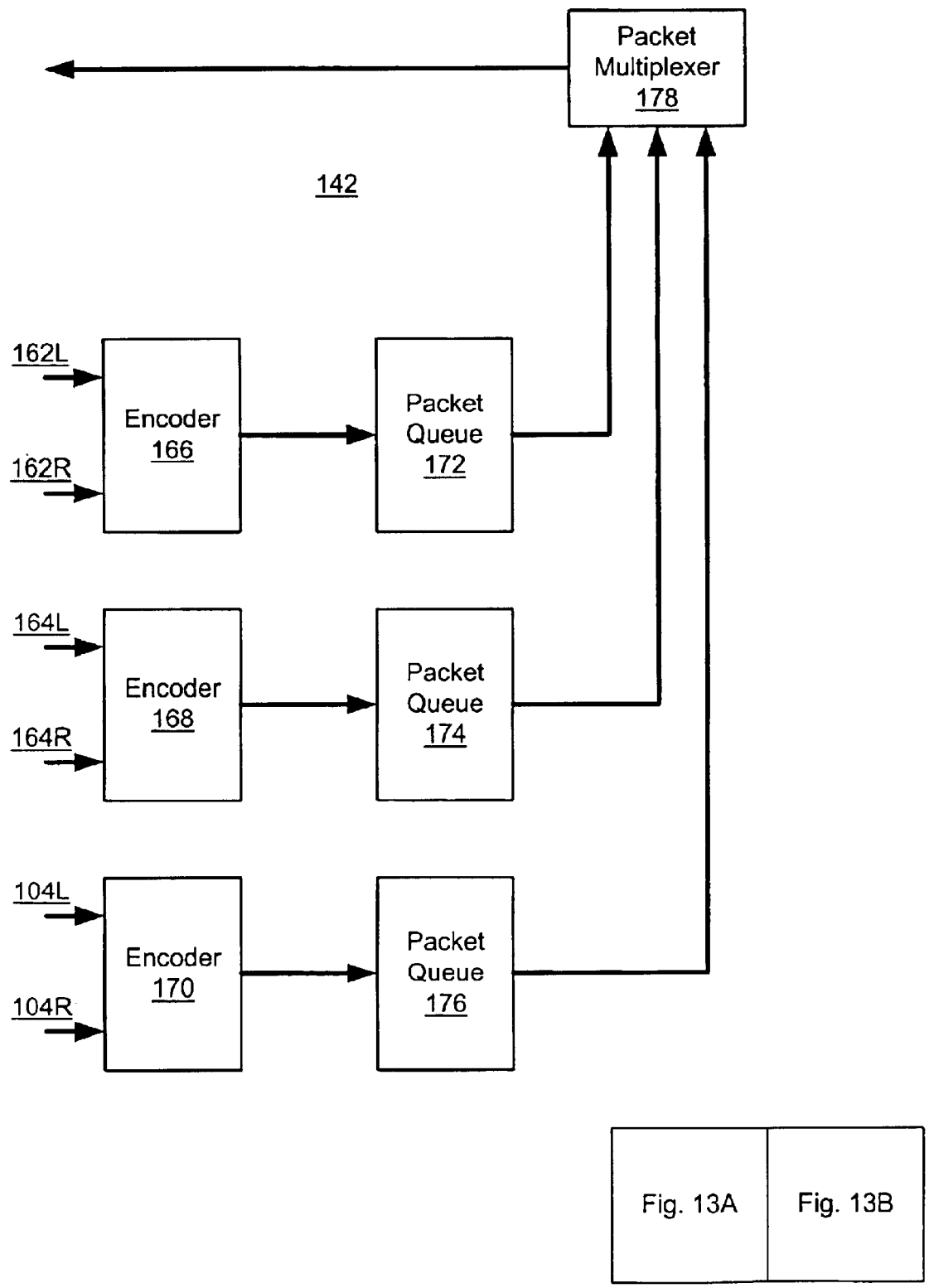

FIGS. 13A and 13B show a high-level block diagram for an MCU implementing an embodiment of the invention for a three-way conference. FIG. 13A shows the section of the MCU that provides decoding, mapping, and mixing; FIG. 13B shows the section of the MCU that re-encodes the mapped and mixed voice data into packet streams directed back to the endpoints.

FIG. 13A corresponds in large part to FIG. 6, with several significant differences. First, an additional processing stream is needed to process voice data from endpoint A (the additional stream consists of decoder 150, jitter buffers 152 and 154, and channel mapper 156). And second, a separate set of mixers is provided for each endpoint, so that each can receive mapped and mixed voice data from all other endpoints. In one embodiment, a single presentation sound field mapping is shared by all endpoints. In an alternate embodiment, each user may provide their own mapping to the MCU. Note that the alternate embodiment may require that a separate mapper be employed for each input stream-to-output stream mapping.

When a single presentation sound field is shared by all endpoints, an administrator selects the presentation sound field sector mapping to be applied to the input voice data streams. If the administrator is automated, it can be located, e.g., in controller 88. If a human administrator is used, a remote GUI, or other means of control, communicates the administrator's sector mapping instructions to MCU 142, e.g., over control channel 144 of FIG. 12. Each user receives the same composite data stream (minus their own voice).

FIG. 13B illustrates the remainder of the MCU processing for this embodiment. Encoders 166, 168, and 170 encode the mixed channels into packets, and submit the packets to packet queues 172, 174, and 176. Packet multiplexer 178 provides for fair merging of the packets from the queues (along with packets from queues for other conference calls, if present) back to network interface 80. Packet queuing can also be done at the output of multiplexer 178 instead of or in addition to the queuing shown in FIG. 13B, but the particular method of queuing is not essential to the invention.

Figure 14:
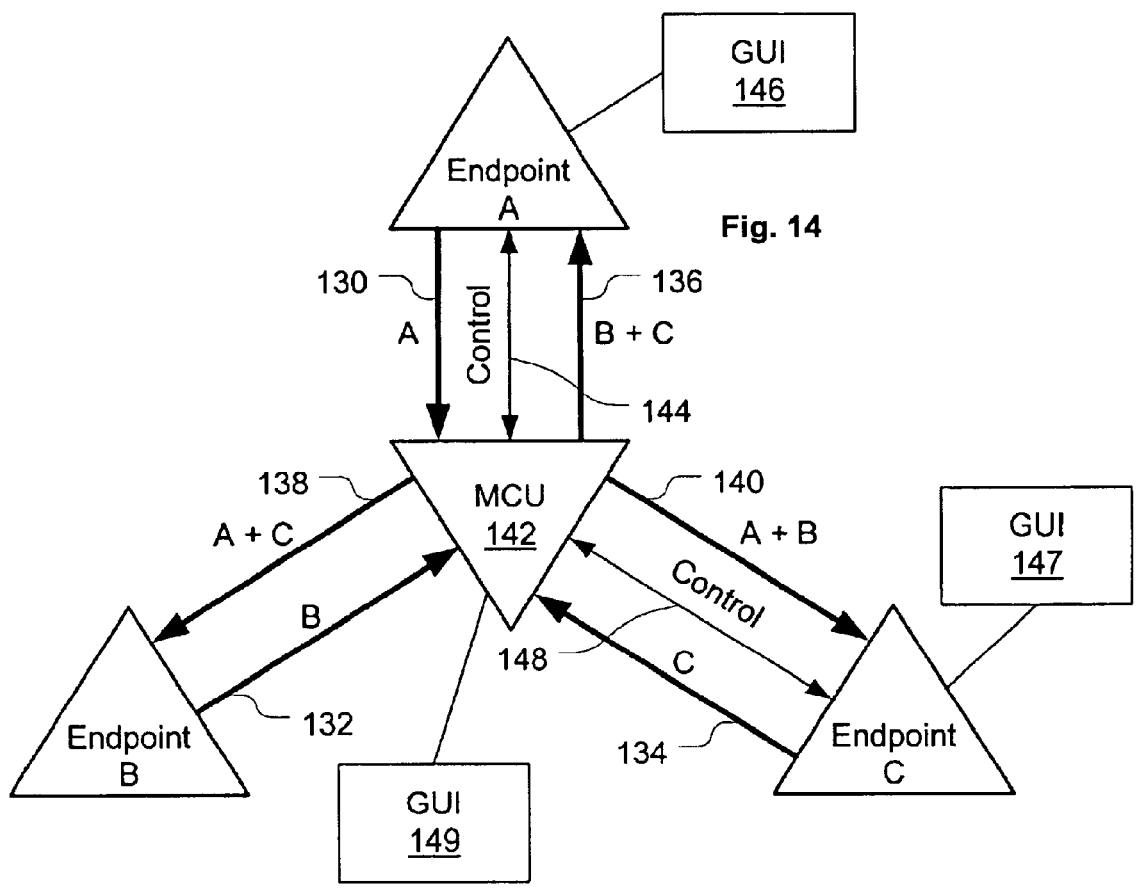
FIG. 14 shows packet data channels existing in a three-way conference with mixing provided at a central MCU, but with each endpoint able to specify source locations in its presentation sound field, according to an embodiment of the invention.

It is not essential that the MCU provides only one mapping for a conference. FIG. 14 illustrates a conference configuration wherein each endpoint is allowed to personally tailor the presentation sound field produced by MCU 142 for that endpoint. A user at each endpoint runs a GUI 146, 147, 149 to specify the sectors desired by that endpoint. GUIs 146 and 147 are illustrated connected through their respective endpoints A, C and control channels 144, 148 to MCU 142. GUI 149 connects to MCU 142 separate from endpoint B.

Figure 15:
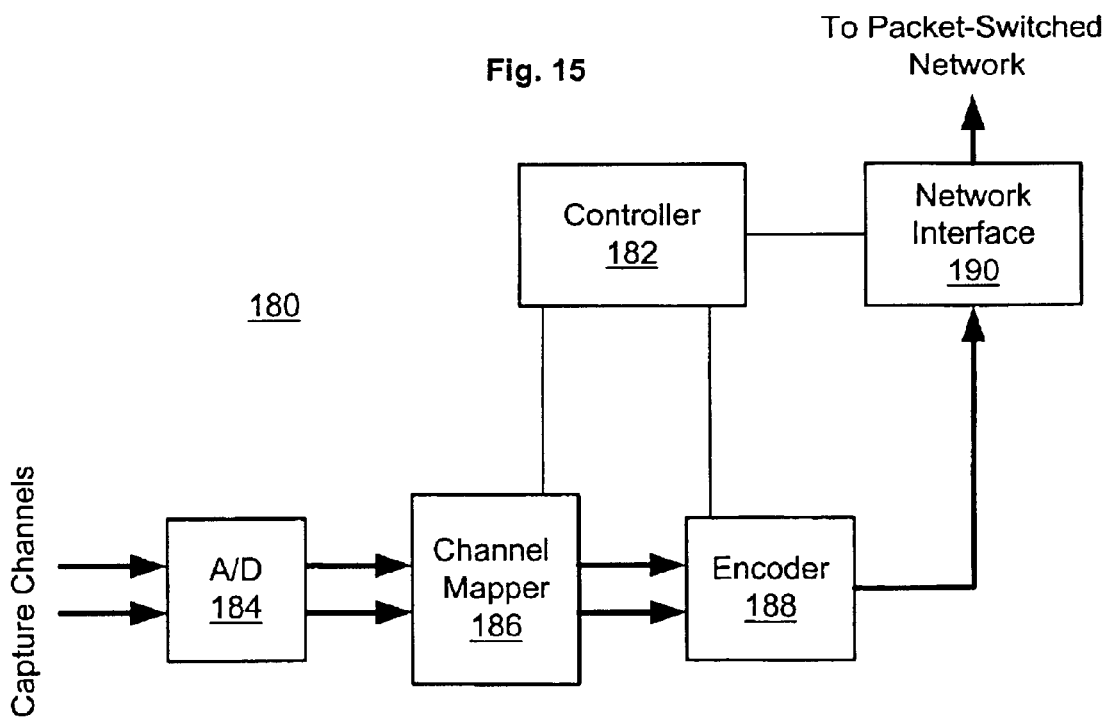
FIG. 15 contains a high-level block diagram for a conferencing endpoint that provides presentation sound field mapping for voice data at its point of origination.

An endpoint processor useful in yet another embodiment of the invention is illustrated in FIG. 15. In this embodiment, channel mapping is provided at the point of origination, i.e., each endpoint maps its own outgoing audio to an assigned presentation sound field sector. This embodiment also has advantages and disadvantages. A first advantage is that channel mapping is probably most effective before encoding. Also, less mapping resources are required than in the first embodiment, and the resources are more distributed than in the second embodiment. A disadvantage is that the endpoints need to negotiate and divide the presentation sound field into sectors, or one endpoint (a master) can assign sectors to the other endpoints. A second disadvantage is that if one or more endpoints do not have this capability, each other endpoint must provide mapping for that endpoint, e.g., according to the first described embodiment. It also bears noting that when different endpoints have different acoustical environments (e.g., speaker locations), all endpoints may not have the same conference experience.

In FIG. 15, controller 182 performs negotiation with other endpoints. From the results of this negotiation, controller 182 configures mapper 186 and encoder 188. The local capture channels typically pass through an A/D converter 184, and are then presented to mapper 186. Mapper 186 maps the capture channels to the negotiated presentation sound field sector. The mapped capture channels are, in essence, analogous to one set of presentation mixing channels from the first embodiment. These presentation mixing channels are sent to encoder 188 for compression and packetization. Finally, network interface 190 places encoded packets on the network to the other endpoints.

One of ordinary skill in the art will recognize that the concepts taught herein can be tailored to a particular application in many other ways. Mapping can take place before data is sent to the jitter buffers. An MCU can be used for some participants, but not others. The sound field can be expanded acoustically, or split into more channels. Although many of the described blocks lend themselves to hardware (even analog) implementation, encoders, decoders, mappers, and mixers also lend themselves to software implementation. Such implementation details are encompassed within the invention, and are intended to fall within the scope of the claims.

The network could take many forms, including cabled telephone networks, wide-area or local-area packet data networks, wireless networks, cabled entertainment delivery networks, or several of these networks bridged together. Different networks may be used to reach different endpoints. The particular protocols used for signaling and voice data packet encapsulation are a matter of design choice.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A packet voice conferencing method comprising:
concurrently receiving a first packet voice data stream from a first conferencing endpoint and a multiple channel second packet voice data stream from a second conferencing endpoint;
mapping the voice data from the first packet voice data stream to a first set of presentation mixing channels in a manner that simulates that voice data as originating in a first sector of a presentation sound field;
mapping the voice data from the second packet voice data stream to a second set of presentation mixing channels in a manner that simulates that voice data as originating in a second sector of a presentation sound field, the second sector substantially non-overlapping the first sector; and
mixing each channel from the first set of presentation mixing channels with the corresponding channel from the second set of presentation mixing channels to form a first set of mixed channels.

2. The method of claim 1, further comprising, for a first packet voice data stream containing information from which voice directional information can be derived:
deriving a voice arrival direction for the voice data in the first packet voice data stream;
dividing the first sector into at least two subsectors, each subsector corresponding to a range of voice arrival directions; and
when mapping the voice data from the first packet voice data stream to the first set of presentation mixing channels, performing the mapping in a manner that simulates that voice data as originating in the subsector of the presentation sound field corresponding to the voice arrival direction angle presently derived for the voice data in the first packet voice data stream.

3. The method of claim 1, further comprising:
receiving, concurrently with the first and second packet voice data streams, a third packet voice data stream from a third conferencing endpoint;
mapping the voice data from the third packet voice data stream to a third set of presentation mixing channels in a manner that simulates that voice data as originating in a third sector of a presentation sound field, the third sector substantially non-overlapping the first and second sectors;
mixing each channel from the first set of presentation mixing channels with the corresponding channel from the third set of presentation mixing channels to form a second set of mixed channels;
mixing each channel from the second set of presentation mixing channels with the corresponding channel from the third set of presentation mixing channels to form a third set of mixed channels; and
transmitting the first, second, and third sets of mixed channels respectively to the third, second, and first conferencing endpoints.

4. The method of claim 3, further comprising establishing a control protocol with one of the first, second, and third conferencing endpoints, and accepting protocol messages from that conferencing endpoint specifying the extent of the first, second, and third sectors of the presentation sound field.

5. The method of claim 1, wherein mapping voice data to a set of presentation mixing channels comprises a method selected from the group consisting of:
splitting a voice data channel from the voice data into at least two voice data channels;
changing the relative delay of one voice data channel from the voice data with respect to another of the voice data channels;
changing the relative phase of one voice data channel from the voice data with respect to another of the voice data channels;
changing the relative amplitude of one voice data channel from the voice data with respect to another of the voice data channels;
splitting a portion of one voice data channel from the voice data and adding that portion to another of the voice data channels; and
combinations thereof.

6. The method of claim 1, further comprising pictorially displaying, on a graphical user interface, a representation of a sound field and representations of each conferencing endpoint to a listener at one conferencing endpoint, allowing that listener to manipulate the interface in order to indicate desired locations of the conferencing endpoints within the sound field, and using the listener's manipulations to set the extent of the sectors of the presentation sound field.

7. An apparatus comprising a computer-readable medium containing computer instructions that, when executed, cause a processor or multiple communicating processors to perform a method for packet voice conferencing, the method comprising:

concurrently receiving a first packet voice data stream from a first conferencing endpoint and a multiple channel second packet voice data stream from a second conferencing endpoint;

mapping the voice data from the first packet voice data stream to a first set of presentation mixing channels in a manner that simulates that voice data as originating in a first sector of a presentation sound field;

mapping the voice data from the second packet voice data stream to a second set of presentation mixing channels in a manner that simulates that voice data as originating in a second sector of a presentation sound field, the second sector substantially non-overlapping the first sector; and mixing each channel from the first set of presentation mixing channels with the corresponding channel from the second set of presentation mixing channels to form a first set of mixed channels.

8. The apparatus of claim 7, the method further comprising:

receiving, concurrently with the first and second packet voice data streams, a third packet voice data stream from a third conferencing endpoint;

mapping the voice data from the third packet voice data stream to a third set of presentation mixing channels in a manner that simulates that voice data as originating in a third sector of a presentation sound field, the third sector substantially non-overlapping the first and second sectors;

mixing each channel from the first set of presentation mixing channels with the corresponding channel from the third set of presentation mixing channels to form a second set of mixed channels;

mixing each channel from the second set of presentation mixing channels with the corresponding channel from the third set of presentation mixing channels to form a third set of mixed channels; and transmitting the first, second, and third sets of mixed channels respectively to the third, second, and first conferencing endpoints.

9. The apparatus of claim 8, the method further comprising establishing a control protocol with one of the first, second, and third conferencing endpoints, and accepting protocol messages from that conferencing endpoint specifying the extent of the first, second, and third sectors of the presentation sound field.

10. The apparatus of claim 8, the method further comprising establishing a control protocol session with a user interface for a participant located at one of the conferencing endpoints, and accepting protocol messages from that user interface specifying the division of the presentation sound field for that endpoint.

11. The apparatus of claim 10, the method further comprising establishing a control protocol session with a user interface for a participant located at each of the other conferencing endpoints, thereby allowing each endpoint to specify its own division of the presentation sound field.

12. The apparatus of claim 7, wherein mapping voice data to a set of presentation mixing channels comprises a method selected from the group consisting of:

splitting a voice data channel from the voice data into at least two voice data channels;

changing the relative delay of one voice data channel from the voice data with respect to another of the voice data channels;

changing the relative phase of one voice data channel from the voice data with respect to another of the voice data channels;

changing the relative amplitude of one voice data channel from the voice data with respect to another of the voice data channels;

splitting a portion of one voice data channel from the voice data and adding that portion to another of the voice data channels; and combinations thereof.

13. The apparatus of claim 12, wherein a mapping is performed on a subchannel basis.

14. The apparatus of claim 7, the method further comprising, when voice data from the first conferencing endpoint is received monaurally, mapping the voice data into multiple voice data subchannels.

15. The apparatus of claim 7, the method further comprising, when voice data from one of the conferencing endpoints comprises multiple voice data channels:

measuring the relative delay between at least two of the multiple channels;

estimating, from the measured relative delay, the arrival direction of a voice signal present in the voice data; and accounting for the estimated arrival direction during mapping of the voice data into a set of presentation mixing channels.

16. The apparatus of claim 7, the method further comprising, for a first packet voice data stream containing information from which voice directional information can be derived:

deriving a voice arrival direction for the voice data in the first packet voice data stream;

dividing the first sector into at least two subsectors, each subsector corresponding to a range of voice arrival directions; and when mapping the voice data from the first packet voice data stream to the first set of presentation mixing channels, performing the mapping in a manner that simulates that voice data as originating in the subsector of the presentation sound field corresponding to the voice arrival direction angle presently derived for the voice data in the first packet voice data stream.

17. The apparatus of claim 7, the method further comprising pictorially displaying, on a graphical user interface, a representation of a sound field and representations of each conferencing endpoint to a listener at one conferencing endpoint, allowing that listener to manipulate the interface in order to indicate desired locations of the conferencing endpoints within the sound field, and using the listener's manipulations to set the extent of the sectors of the presentation sound field.

18. The apparatus of claim 17, the method further comprising allowing the listener to divide a sector into subsectors, and to manipulate each subsector of that sector within the presentation sound field independent of the other subsectors of that sector.

19. The apparatus of claim 17, wherein the graphical user interface further allows the listener to specify the number and locations of presentation channel acoustical speakers relative to that listener's position in a room, the method further comprising accounting for the number and locations of presentation channel acoustical speakers in mapping voice data to presentation mixing channels.

20. The apparatus of claim 17, the method further comprising recurrently updating the graphical user interface with a visual indication of which endpoint or endpoints is/are currently transmitting voice data.

21. The apparatus of claim 17, the method further comprising automatically dividing the presentation sound field into sectors that allocate approximately equal shares of the presentation sound field to each endpoint.

22. The apparatus of claim 21, the method further comprising tracking the number of conferencing endpoints participating in a conference, and automatically altering the allocation of the presentation sound field as endpoints are added to or leave the conference.

23. The apparatus of claim 21, wherein a larger sector of the sound field is allocated to a conferencing endpoint that is broadcasting multiple capture channels than is allocated to a conferencing endpoint that is broadcasting monaurally.

24. A packet voice conferencing system comprising:
means for concurrently receiving multiple packet voice data streams where at least one of the multiple packet voice data streams comprises at least two channels;
means for manipulating the voice data in each of the packet voice data streams in a manner that simulates that voice data as originating in a specified sector of a presentation sound field, the sectors arranged in the sound field in substantially non-overlapping fashion; and
means for combining the manipulated voice data from each packet voice data stream into a set of presentation channels.

25. The packet voice conferencing system of claim 24, further comprising means for specifying the sector of the presentation sound field to be applied to each packet voice data stream.

26. The packet voice conferencing system of claim 24, further comprising means for varying the specified sector of the presentation sound field for a packet voice data stream depending on a voice arrival direction derived for that packet voice data stream.

27. The packet voice conferencing system of claim 24, incorporated into one of the conferencing endpoints.

28. A packet voice conferencing system comprising:
first and second decoders, to respectively decode first and second packet voice data streams and produce first and second sets of one or more voice data channels from the voice data packets contained in the streams;
a packet switch to receive packet voice data streams sent to the system by first and second conferencing endpoints, at least the first conferencing endpoint comprising a multiple channel packet voice data stream, and to distribute the packet voice data stream received from the first conferencing endpoint to the first decoder and the packet voice data stream received from the second conferencing endpoint to the second decoder;
a first channel mapper to map the first set of voice data channels to a first set of presentation mixing channels in a manner that simulates the voice data as originating in a first sector of a presentation sound field;
a second channel mapper to map the second set of voice data channels to a second set of presentation mixing channels in a manner that simulates the voice data as originating in a second sector of a presentation sound field, the second sector substantially non-overlapping the first sector; and
a first set of mixers, each mixer combining one of the first set of presentation mixing channels with a corresponding one of the second set of presentation mixing channels to form a mixed channel, the set of mixers collectively forming a first set of mixed channels.

29. The packet voice conferencing system of claim 28, further comprising:
a third decoder to decode a third packet voice data stream and produce a third set of one or more voice data channels from the voice data packets contained in the third stream, the packet switch receiving the third packet voice data stream from a third conferencing endpoint and distributing the third packet voice data stream to the third decoder;
a third channel mapper to map the third set of voice data channels to a third set of presentation mixing channels in a manner that simulates the voice data as originating in a third sector of a presentation sound field, the third sector substantially non-overlapping the first and second sectors;
a second set of mixers, each mixer in the second set combining one of the first set of presentation mixing channels with a corresponding one of the third set of presentation mixing channels to form a mixed channel, the second set of mixers collectively forming a second set of mixed channels;
a third set of mixers, each mixer in the third set combining one of the second set of presentation mixing channels with a corresponding one of the third set of presentation mixing channels to form a mixed channel, the third set of mixers collectively forming a third set of mixed channels; and
a transmitter to dispatch the first, second, and third sets of mixed channels respectively to the third, second, and first conferencing endpoints.

30. The packet voice conferencing system of claim 29, further comprising a controller connected to each channel mapper, the controller configuring each channel mapper according to its designated sound field sector.

31. The packet voice conferencing system of claim 30, wherein the controller communicates with one of the first, second, and third conferencing endpoints using a control protocol and accepts protocol messages from that conferencing endpoint specifying the extent of the first, second, and third sectors of the presentation sound field.

32. The packet voice conferencing system of claim 28, further comprising a jitter buffer for each voice data channel, each jitter buffer delaying its respective voice data channel prior to submission to a mapper.

33. The packet voice conferencing system of claim 32, further comprising a controller connected to the jitter buffers to synchronize the relative delays of multiple jitter buffers associated with a common mixed channel.

34. The packet voice conferencing system of claim 28, further comprising a graphical user interface driver to create a display for a listener and manipulate that display in response to listener inputs, the display including a representation of a sound field and representations of each conferencing endpoint, the driver using listener inputs to set the extent of the sectors of the presentation sound field.

35. The packet voice conferencing system of claim 34, wherein the graphical user interface driver allows the listener to divide a sector into subsectors, and to manipulate each subsector of that sector within the presentation sound field independent of the other subsectors of that sector.

36. A packet voice conferencing system comprising:
- a decoder, to decode a multiple channel packet voice data stream to produce a set of one or more voice data subchannels from the voice data packets contained in the stream and a voice arrival direction corresponding to the set of voice data subchannels;
- a controller to select one of a plurality of presentation sound field subsectors for the voice data subchannels based on the voice arrival direction, each subsector corresponding to a range of voice arrival directions; and
- a channel mapper to map the set of voice data subchannels to a set of presentation channels in a manner that simulates the voice data as originating in the selected subsector of the presentation sound field.

37. The packet voice conferencing system of claim 36, wherein the voice arrival direction is explicitly communicated in the packet voice data stream.

38. The packet voice conferencing system of claim 36, wherein the set of voice data channels comprises two or more channels, and wherein the decoder comprises a direction finder to estimate the voice arrival direction by comparing at least one of the voice data channels to another of the voice data channels.

39. A packet voice conferencing system having one or more local audio capture channels, the system comprising:
- a controller to negotiate with other packet voice conferencing systems connected in a common conference, wherein the results of a negotiation include a codec to be used by the system for encoding the local audio capture channels, and a presentation sound field sector allocated to the local audio capture channels;
- a channel mapper to map the local audio capture channels to a set of presentation mixing channels in a manner that simulates the audio data on the capture channels as originating in the allocated presentation sound field sector; and
- an encoder to encode the presentation mixing channels into a packet voice data stream.

40. The packet voice conferencing system of claim 39, where one of the other packet voice conferencing systems operates as a master.

41. An apparatus comprising a computer-readable medium containing computer instructions that, when executed, cause a processor or multiple communicating processors to perform a method for packet voice conferencing, the method comprising:
- concurrently receiving a first packet voice data stream from a first conferencing endpoint and a second packet voice data stream from a second conferencing endpoint;
- mapping the voice data from the first packet voice data stream to a first set of presentation mixing channels in a manner that simulates that voice data as originating in a first sector of a presentation sound field;
- mapping the voice data from the second packet voice data stream to a second set of presentation mixing channels in a manner that simulates that voice data as originating in a second sector of a presentation sound field, the second sector substantially non-overlapping the first sector;
- mixing each channel from the first set of presentation mixing channels with the corresponding channel from the second set of presentation mixing channels to form a first set of mixed channels;
- when voice data from one of the conferencing endpoints comprises multiple voice data channels;
- measuring the relative delay between at least two of the multiple channels;
- estimating, from the measured relative delay, the arrival direction of a voice signal present in the voice data; and
- accounting for the estimated arrival direction during mapping of the voice data into a set of presentation mixing channels.

42. An apparatus comprising a computer-readable medium containing computer instructions that, when executed, cause a processor or multiple communicating processors to perform a method for packet voice conferencing, the method comprising:
- concurrently receiving a first packet voice data stream from a first conferencing endpoint and a second packet voice data stream from a second conferencing endpoint;
- mapping the voice data from the first packet voice data stream to a first set of presentation mixing channels in a manner that simulates that voice data as originating in a first sector of a presentation sound field;
- mapping the voice data from the second packet voice data stream to a second set of presentation mixing channels in a manner that simulates that voice data as originating in a second sector of a presentation sound field, the second sector substantially non-overlapping the first sector;
- mixing each channel from the first set of presentation mixing channels with the corresponding channel from the second set of presentation mixing channels to form a first set of mixed channels;
- pictorially displaying, on a graphical user interface, a representation of a sound field and representations of each conferencing endpoint to a listener at one conferencing endpoint, allowing that listener to manipulate the interface in order to indicate desired locations of the conferencing endpoints within the sound field, and using the listener's manipulations to set the extent of the sectors of the presentation sound field;
- wherein the graphical user interface further allows the listener to specify the number and locations of presentation channel acoustical speakers relative to that listener's position in a room, the method further comprising accounting for the number and locations of presentation channel acoustical speakers in mapping voice data to presentation mixing channels.

43. An apparatus comprising a computer-readable medium containing computer instructions that, when executed, cause a processor or multiple communicating processors to perform a method for packet voice conferencing, the method comprising:
- concurrently receiving a first packet voice data stream from a first conferencing endpoint and a second packet voice data stream from a second conferencing endpoint;
- mapping the voice data from the first packet voice data stream to a first set of presentation mixing channels in a manner that simulates that voice data as originating in a first sector of a presentation sound field;
- mapping the voice data from the second packet voice data stream to it second set of presentation mixing channels in a manner that simulates that voice data as originating in a second sector of a presentation sound field, the second sector substantially non-overlapping the first sector;

mixing each channel from the first set of presentation mixing channels with the corresponding channel from the second set of presentation mixing channels to form a first set of mixed channels;

pictorially displaying, on a graphical user interface, a representation of a sound field and representations of each conferencing endpoint to a listener at one conferencing endpoint, allowing that listener to manipulate the interface in order to indicate desired locations of the conferencing endpoints within the sound field, and using the listener's manipulations to set the extent of the sectors of the presentation sound field;

automatically dividing the presentation sound field into sectors that allocate approximately equal shares of the presentation sound field to each endpoint;

tracking the number of conferencing endpoints participating in a conference, and automatically altering the allocation of the presentation sound field as endpoints are added to or leave the conference.

44. An apparatus comprising a computer-readable medium containing computer instructions that, when executed, cause a processor or multiple communicating processors to perform a method for packet voice conferencing, the method comprising:

concurrently receiving a first packet voice data stream from a first conferencing endpoint and a second packet voice data stream from a second conferencing endpoint;

mapping the voice data from the first packet voice data stream to a first set of presentation mixing channels in a manner that simulates that voice data as originating in a first sector of a presentation sound field;

mapping the voice data from the second packet voice data stream to a second set of presentation mixing channels in a manner that simulates that voice data as originating in a second sector of a presentation sound field, the second sector substantially non-overlapping the first sector;

mixing each channel from the first set of presentation mixing channels with the corresponding channel from the second set of presentation mixing channels to form a first set of mixed channels;

displaying, on a graphical user interface, a representation of a sound field and representations of each conferencing endpoint to a listener at one conferencing endpoint, allowing that listener to manipulate the interface in order to indicate desired locations of the conferencing endpoints within the sound field, and using the listener's manipulations to set the extent of the sectors of the presentation sound field;

automatically dividing the presentation sound field into sectors that allocate approximately equal shares of the presentation sound field to each endpoint;

wherein a larger sector of the sound field is allocated to a conferencing endpoint that is broadcasting multiple capture channels than is allocated to a conferencing endpoint that is broadcasting monaurally.

* * * * *